(12) United States Patent
Cheng

(10) Patent No.: US 8,209,364 B2
(45) Date of Patent: Jun. 26, 2012

(54) ELECTRONIC DEVICES AND OPERATION METHODS OF A FILE SYSTEM

(75) Inventor: Chang-Kai Cheng, Hsinchu (TW)

(73) Assignee: Silicon Motion, Inc., Jhubei, Hsinchu County (TW)

(*) Notice: Subject to any disclaimer, the term of this patent is extended or adjusted under 35 U.S.C. 154(b) by 505 days.

(21) Appl. No.: 12/550,610

(22) Filed: Aug. 31, 2009

(65) Prior Publication Data
US 2010/0306454 A1    Dec. 2, 2010

(30) Foreign Application Priority Data
May 27, 2009    (TW) .............................. 98117699 A

(51) Int. Cl.
*G06F 12/00* (2006.01)

(52) U.S. Cl. .................... 707/824; 711/103; 707/822

(58) Field of Classification Search .................. None
See application file for complete search history.

(56) References Cited

U.S. PATENT DOCUMENTS

| | | | | |
|---|---|---|---|---|
| 6,819,394 | B1 * | 11/2004 | Nomura et al. | 352/38 |
| 7,389,038 | B1 * | 6/2008 | Watanabe et al. | 386/239 |
| 7,492,491 | B2 * | 2/2009 | Saitoh | 358/474 |

* cited by examiner

*Primary Examiner* — Kevin Ellis
*Assistant Examiner* — Baboucarr Faal
(74) *Attorney, Agent, or Firm* — Thomas|Kayden

(57) ABSTRACT

An operation method of file system includes retrieving the first header of the first file, adding the auxiliary data to the first header to generate the second header, writing the dummy data into the second header to adjust the data length of the second header, thereby serving as the third header, and modifying the link relation of clusters recorded in the file allocation table such that the third header and the second data segment are linked together, thereby generating the second file.

19 Claims, 5 Drawing Sheets

ELECTRONIC DEVICES AND OPERATION METHODS OF A FILE SYSTEM

CROSS REFERENCE TO RELATED APPLICATIONS

This Application claims priority of Taiwan Patent Application No. 098117699, filed on May 27, 2009, the entirety of which is incorporated by reference herein.

BACKGROUND OF THE INVENTION

1. Field of the Invention

The present invention relates to apparatus and operation methods of file system, and in particular relates to methods and electronic devices for modifying the file header.

2. Description of the Related Art

When the computer stores files, the disk driver needs to record files information (name, location, size, etc.) into the file allocation table (FAT). The computer also needs to first find locations of files from the FAT when retrieving or storing files, such that the desired files can be successfully found. The FAT will record which clusters have been used, which clusters have not been used, and cluster locations in which the files are stored. The cluster is the basic unit of files storage, one cluster consists of many sectors, and the cluster is the smallest unit of storage space that the operating system can allocate to a file. If a file's size is smaller than one cluster, the file will occupy one cluster. If a file's size exceeds the amount that can be contained in one cluster, the file will also occupy an integer number of clusters. It is noted that a file may be stored in discontiguous clusters.

Conventionally, the method for modifying the file header is to copy the original data following the old header to the end of the new header. However, such method may result in a large amount of data movement, causing degraded performance accordingly.

BRIEF SUMMARY OF THE INVENTION

A detailed description is given in the following embodiments with reference to the accompanying drawings.

The purpose of the present invention is to provide an operation method of file system, and more particularly to an operation method of file system that eliminates a large amount of data movement during modifying the file header.

In one embodiment, the present invention provides an operation method of a file system. In the method, a first header of a first file is retrieved, wherein the first file comprises the first header and a data segment, the data segment comprises a first data segment and a second data segment. A plurality of clusters $A_1 \sim A_N$ chained together constitute the first file, each of the clusters $A_1 \sim A_N$ has a first data length. A data length of the first data segment is smaller than the first data length. The first header and the first data segment are stored in the clusters $A_1 \sim A_Y$. The second data segment is stored in the clusters $A_{Y+1} \sim A_N$, N and Y are positive integer, and N>Y. The first data segment is stored in the cluster $A_Y$. Auxiliary data is added to the first header to generate a second header, dummy data is written into the second header to adjust the data length of the second header, thereby serving as a third header. A link relation of clusters recorded in a file allocation table is modified such that the third header and the second data segment are linked together, thereby generating a second file.

In another embodiment, the present invention provides an electronic device. The electronic device comprises a random access memory coupled to a bus for storing temporary data. The electronic device also comprises a flash memory coupled to the bus for storing a location information. The electronic device also comprises a processor coupled to the bus for retrieving a first header of a first file and a file allocation table from a memory card, writing the first header and the file allocation table into the random access memory, wherein the first file comprises the first header and a data segment, the data segment comprises a first data segment and a second data segment. A plurality of clusters $A_1 \sim A_N$ chained together constitute the first file, each of the clusters $A_1 \sim A_N$ has a first data length. A data length of the first data segment is smaller than the first data length. The first header and the first data segment are stored in the clusters $A_1 \sim A_Y$. The second data segment is stored in the clusters $A_{Y+1} \sim A_N$, N and Y are positive integer, and N>Y. The first data segment is stored in the cluster $A_Y$. The processor of the electronic device further retrieves the location information and writes it into the first header to generate a second header, writes dummy data into the second header to adjust the data length of the second header, thereby serving as a third header. The processor further modifies a link relation of clusters recorded in the file allocation table such that the third header and the second data segment are linked together, thereby generating a second file.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
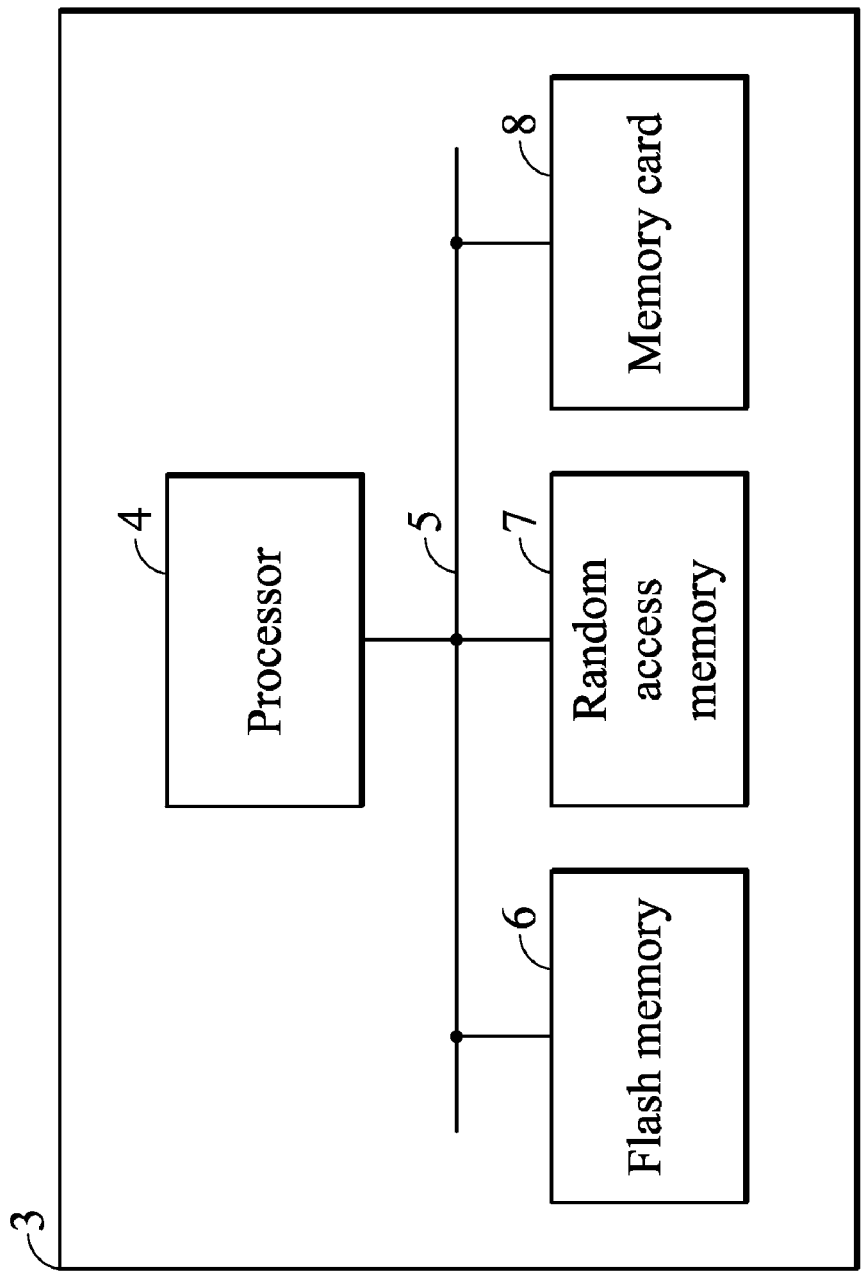
FIG. 1 is a schematic diagram illustrating an embodiment of an electronic device according to the present invention.
Figures 2, 3:
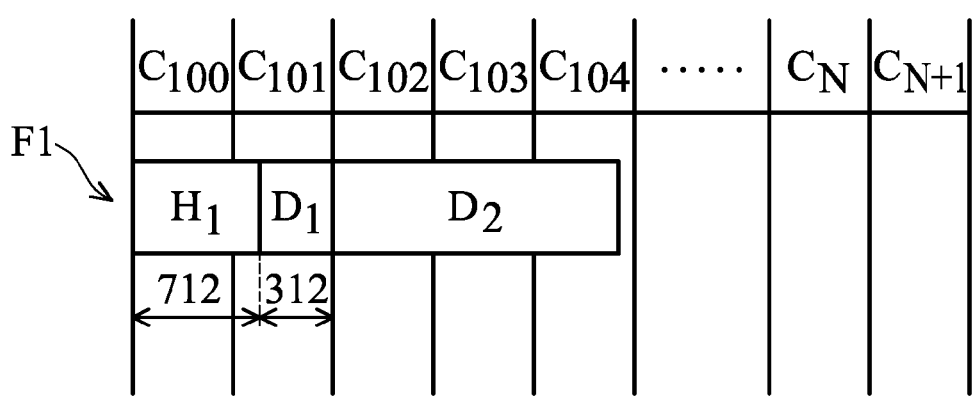
FIG. 2 is a comparison table stored in the flash memory of the present invention.
FIG. 3 is a schematic diagram illustrating a storage location of the first picture file under a FAT file system according to the present invention.

FIG. 1 shows an embodiment of an electronic device according to the present invention. As shown in FIG. 1, the electronic device 3 comprises a processor 4, a bus 5, a flash memory 6, a random access memory (RAM) 7, and a memory card 8. For example, the electronic device 3 can be a consumer electronics product or a portable electronic device, such as mobile phone, PDA (Personal Digital Assistant), iPod, GPS (Global Positioning System) navigator, lap-top computer, etc. In one embodiment, the electronic device 3 can be a GPS recorder, but is not limited thereto. The electronic device 3 not only can automatically record the route information, but also can write the recorded location (or coordinate) information into the picture files. For example, the electronic device 3 can record longitude, latitude, time, and altitude (elevation) data corresponding to different sites and store them into the flash memory 6, but is not limited thereto. Referring now to FIG. 2, a comparison table stored in the flash memory 6 is shown and is used to show different locations and their corresponding time. For example, time T1 corresponds to location L1, i.e., the user is at location L1 at time T1. Time T2 corresponds to location L2, i.e., the user is at location L2 at time T2, and so on.

The processor 4 can be a central processing unit (CPU), a microprocessor, a microcontroller or the like, but is not limited thereto. The processor 4 controls the bus 5, the flash memory 6, the RAM 7, and the memory card 8 to perform the various functions of the electronic device 3. The memory card 8 may be a removable or external memory device, such as universal serial bus USB (USB), SD card, CF card, SM card, MMC card, MS card or the like, but is not limited thereto. The memory card 8 is configured to store various data, such as picture files, video files, audio files, document files or the like, but is not limited thereto. For example, when used in a digital camera, the memory card 8 stores picture files and a FAT that records the locations of the picture files, but is not limited thereto.

In one embodiment, the memory card 8 stores at least a first picture file F1, and the FAT that records the location of the first picture file F1. For example, the first picture file F1 within the memory card 8 is a JPEG type picture file, but is not limited thereto. Referring now to FIG. 3, a storage location of the first picture file F1 under a FAT file system is shown, wherein the clusters $C_{100}$~$C_{104}$ represent the clusters allocated to the first picture file F1, but is not limited to this cluster link relation, other different types of cluster link relation may be available. Each cluster's size (data length) can be generally 512 Bytes~32 KB, note that each cluster's size is 512 Bytes in this embodiment, but is not limited thereto. As shown in FIG. 3, the first picture file F1 comprises a first header ($H_1$) and a data segment, the data segment comprises a first data segment ($D_1$) and a second data segment ($D_2$). The clusters $C_{100}$~$C_{104}$ chained together constitute the first picture file F1, each cluster has a first data length (512 Bytes), and the data length (312 Bytes) of the first data segment ($D_1$) is smaller than 512 Bytes. The first header ($H_1$) and first data segment ($D_1$) are stored in the clusters $C_{100}$~$C_{101}$, the second data segment ($D_2$) is stored in the clusters $C_{102}$~$C_{104}$, and the first data segment ($D_1$) is stored in the cluster $C_{101}$. For example, the first header ($H_1$) has the information related to the first picture file F1, such as photo-taking time, file size, etc., of the first picture file F1.

Operational steps that the electronic device 3 writes the recorded location information into the first picture file F1 will be described below. Firstly, after inserting the memory card 8 into the electronic device 3, the processor 4 retrieves the first header ($H_1$) and the FAT from the memory card 8 according to an enable signal (not shown), and writes the first header ($H_1$) and the FAT into the RAM 7. The processor 4 retrieves the location information from the flash memory 6 and writes into the first header ($H_1$) to generate a second header ($H_2$). It is noted that the processor 4 may compare the photo-taking time of the picture files with the time shown in FIG. 2, thereby correctly writing the location information into the corresponding picture files. Generally, the processor 4 finds the time equal or closest to the photo-taking time of the first picture file F1 from the time shown in FIG. 2, and takes the location corresponding to the found time as the photo-taking site of the first picture file F1. For example, if the photo-taking time of the first picture file F1 is T1, the processor 4 writes the location L1 into the first header ($H_1$) to serve as the photo-taking site of the first picture file F1.

Next, the processor 4 writes dummy data into the second header ($H_2$) to adjust the data length of the second header ($H_2$), and uses the length-adjusted header to serve as a third header ($H_3$). Then, the processor 4 stores the third header ($H_3$) within the RAM 7 into the memory card 8. Related steps will be described in more detail in the following embodiments.

Next, the processor 4 modifies the link relation of clusters recorded in the FAT such that the third header ($H_3$) and the second data segment ($D_2$) are linked together, thereby generating a second picture file F2 to replace the first picture file F1. Finally, the processor 4 stores the modified FAT into the memory card 8. Therefore, in the future, the picture files with the location information can be retrieved from the memory card 8 under the FAT file system.

Figure 4A:
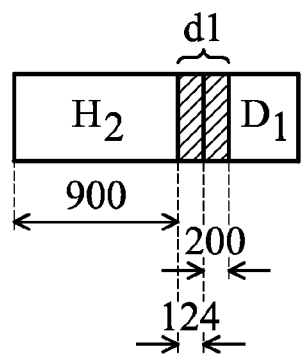
FIG. 4a is a schematic diagram illustrating one embodiment of generating the third header according to the present invention.

FIG. 4a shows an embodiment of generating the third header ($H_3$) according to the present invention. After generating the second header ($H_2$), the processor 4 writes the dummy data (d1) into the second header ($H_2$) to generate the third header ($H_3$) having (Z*L−D) Bytes of data length, wherein L is the first data length, D is the data length of the first data segment ($D_1$), and Z is the number greater than or equal to the number of clusters occupied by the first header ($H_1$) and the first data segment ($D_1$). In this embodiment, the data length of the first header ($H_1$) is 712 Bytes, the data length of the first data segment ($D_1$) is 312 Bytes, the data length of the second header ($H_2$) is 900 Bytes, and the data length of the third header ($H_3$) is determined to be (3*512−312)=1224 Bytes using the above formula. Next, the processor 4 stores the third header ($H_3$) and the first data segment ($D_1$) into the clusters $C_{200}$~$C_{202}$ (not limited to this cluster link relation, other different types of cluster link relation may be available) of the memory card 8, wherein the clusters $C_{200}$~$C_{202}$ are chained together, and each of clusters $C_{200}$~$C_{202}$ has the first data length. Finally, the processor 4 records the link relation of clusters $C_{200}$~$C_{202}$ into the FAT.

Figure 4B:
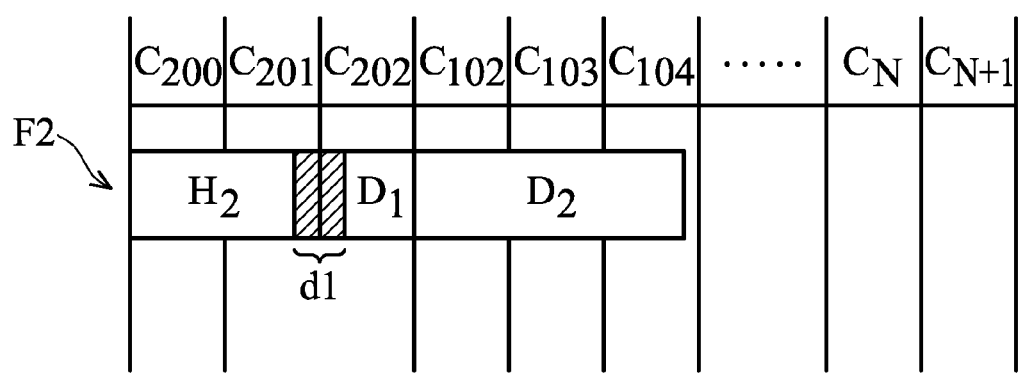
FIG. 4b is a schematic diagram illustrating one embodiment of generating the second picture file according to the present invention

FIG. 4b shows an embodiment of generating the second picture file F2 according to the present invention. As shown in FIG. 4b, the processor 4 modifies the link relation of clusters recorded in the FAT to link cluster $C_{202}$ to cluster $C_{102}$ such that the clusters $C_{200}$~$C_{202}$ and $C_{102}$~$C_{104}$ are chained together, thereby generating the second picture file F2 to replace the first picture file F1. Finally, the processor 4 stores the modified FAT into the memory card 8.

Figure 5A:
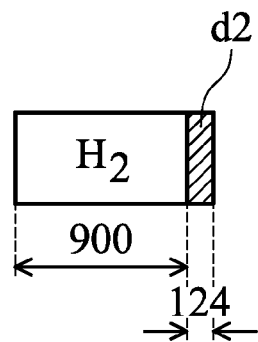
FIG. 5a is a schematic diagram illustrating another embodiment of generating the third header according to the present invention.

FIG. 5a shows another embodiment of generating the third header ($H_3$) according to the present invention. After generating the second header ($H_2$), the processor 4 writes the dummy data (d2) into the second header ($H_2$) to generate the third header ($H_3$) having (Z*L) Bytes of data length, wherein L is the first data length, and Z is the number greater than or equal to the number of clusters occupied by the first header ($H_1$) and the first data segment ($D_1$). In this embodiment, the data length of the first header ($H_1$) is 712 Bytes, the data length of the second header ($H_2$) is 900 Bytes, and the data length of the third header ($H_3$) is determined to be (2*512)=1024 Bytes using the above formula. Next, the processor 4 stores the third header ($H_3$) into the clusters $C_{300}$~$C_{301}$ (not limited to this cluster link relation, other different types of cluster link relation may be available) of the memory card 8, wherein the clusters $C_{300}$~$C_{301}$ are chained together, and each of clusters $C_{300}$~$C_{301}$ has the first data length. Finally, the processor 4 records the link relation of clusters $C_{300}$~$C_{301}$ into the FAT.

Figure 5B:
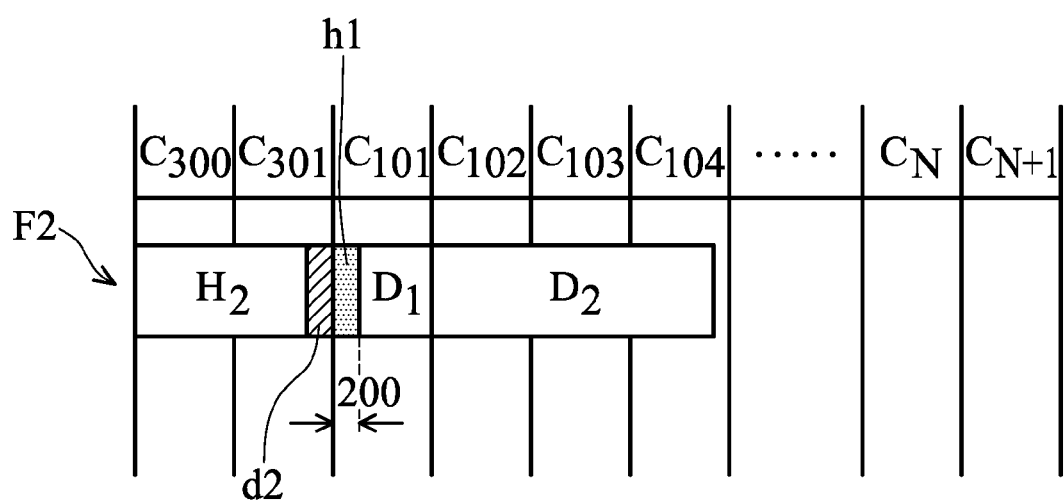
FIG. 5b is a schematic diagram illustrating another embodiment of generating the second picture file according to the present invention.
Figure 6:
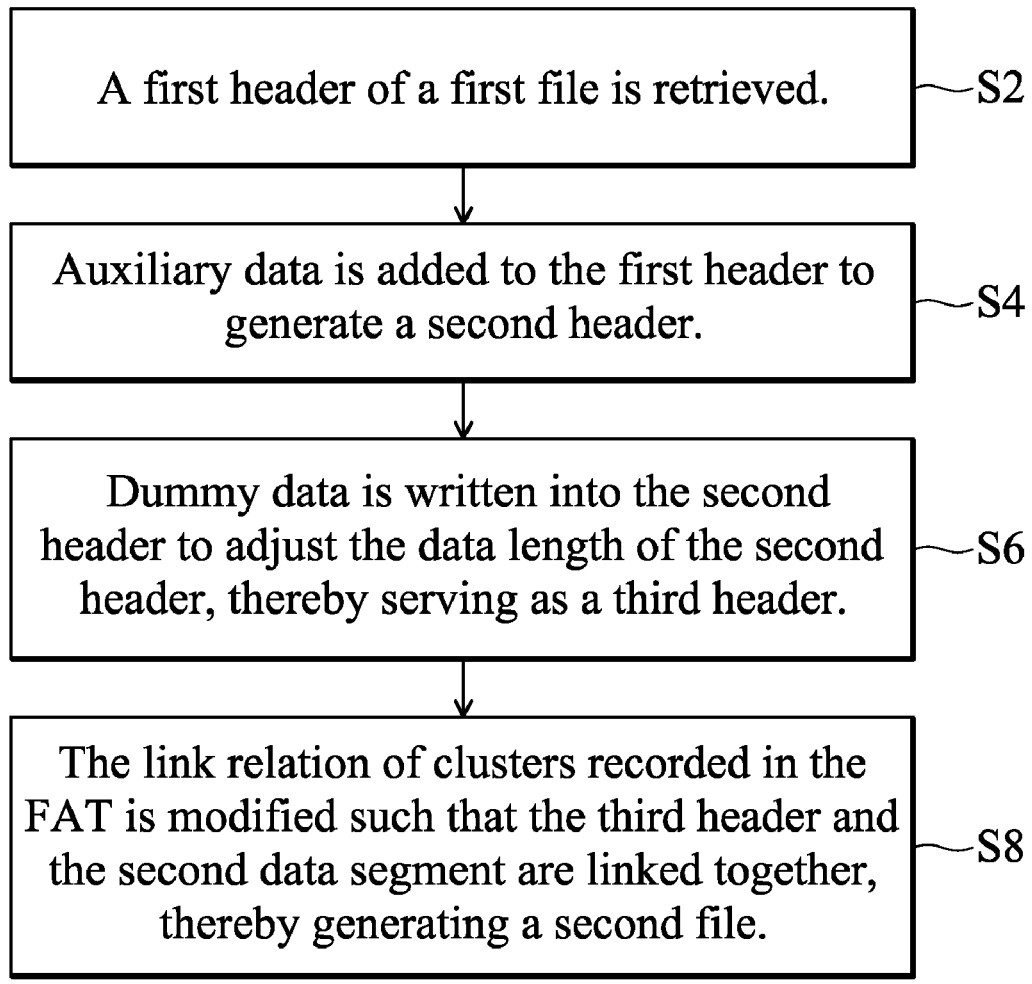
FIG. 6 is a flow chart illustrating an operation method of file system according to the present invention.

FIG. 5b is a schematic diagram illustrating another embodiment of generating the second picture file F2 according to the present invention. As shown in FIG. 5b, the processor 4 modifies the link relation of clusters recorded in the FAT to link cluster $C_{301}$ to cluster $C_{101}$ such that the clusters $C_{300}$~$C_{301}$ and $C_{101}$~$C_{104}$ are chained together, thereby generating the second picture file F2 to replace the first picture file F1. Finally, the processor 4 stores the modified FAT into the memory card 8. It is noted that the effective length of the second picture file F2 is also determined to be Z*L−D since the portion of data (h1) in the original first header ($H_1$) is contained in the cluster $C_{110}$.

Conventionally, as mentioned above, the method for modifying the file header is to copy the original data following the old header to the end of the new header. However, such method may result in a large amount of data movement, causing degraded performance accordingly. On the contrary, the embodiments of the invention simply need to adjust the data length of the header and to link the remaining data to the adjusted header by modifying the FAT. Hence, the embodiment of the present invention can eliminate a large amount of data movement during modifying the file header. Therefore, the method for modifying the file header of the present invention can improve in both execution speed and system performance.

The present invention also provides an operation method of file system. In the method, a first header of a first file is retrieved (step S2), auxiliary data is added to the first header to generate a second header (step S4), dummy data is written into the second header to adjust the data length of the second header, thereby serving as a third header (step S6), and the link relation of clusters recorded in the FAT is modified such that the third header and the second data segment are linked together, thereby generating a second file (step S8). This operation method of file system can be implemented by an electronic device, such as mobile phone, PDA (Personal Digital Assistant), iPod, GPS (Global Positioning System) navigator, lap-top computer, etc. In this embodiment, the electronic device 3 can be a GPS recorder, but is not limited thereto.

For example, in step S2, the first header and the FAT can be retrieved from a memory card and then written into a RAM. For example, as shown in FIG. 3, the first file comprises a first header ($H_1$) and a data segment, the data segment comprises a first data segment ($D_1$) and a second data segment ($D_2$). The clusters $C_{100}$~$C_{104}$ chained together constitute the first file, each cluster has a first data length (512 Bytes), and the data length (312 Bytes) of the first data segment ($D_1$) is smaller than 512 Bytes. The first header ($H_1$) and first data segment ($D_1$) are stored in the clusters $C_{100}$~$C_{101}$, the second data segment ($D_2$) is stored in the clusters $C_{102}$~$C_{104}$, and the first data segment ($D_1$) is stored in the cluster $C_{101}$. For example, the first file may be a JPEG type picture file, and the first header ($H_1$) has the information related to the first file, such as photo-taking time, file size, etc., of the first file.

In step S4, the auxiliary data is the location information retrieved from a flash memory. For example, the auxiliary data may be the photo-taking time of the first file as the first file is a picture file, and it should be noted that the auxiliary data can be obtained by comparing the build-up time (e.g. photo-taking time) of the first file with the time shown in FIG. 2. Generally, the processor finds the time equal or closest to the photo-taking time of the first file from the time shown in FIG. 2, and takes the location corresponding to the found time to serve as the photo-taking site of the first file. For example, if the photo-taking time of the first file is equal (or closest) to Ti, the location L1 will be the photo-taking site of the first file. Then, the photo-taking site of the first file can be served as the auxiliary data and added to the first header, thereby generating the second header.

In step S6, generation of the third header further comprises adjusting the data length of the second header to Z*L−D or Z*L, and using the length-adjusted header to serve as the third header, wherein L is the first data length, D is the data length of the first data segment ($D_1$), and Z is the number greater than or equal to the number of clusters occupied by the first header ($H_1$) and the first data segment ($D_1$). For example, as shown in FIG. 4a, the data length of the first header ($H_1$) is 712 Bytes, the data length of the first data segment ($D_1$) is 312 Bytes, the data length of the second header ($H_2$) is 900 Bytes, and the data length of the third header ($H_3$) is determined to be (3*512−312)=1224 Bytes using the above formula. Next, the third header ($H_3$) and the first data segment ($D_1$) are stored into the clusters $C_{200}$~$C_{202}$ (not limited to this cluster link relation, other different types of cluster link relation may be available) of the memory card, wherein the clusters $C_{200}$~$C_{202}$ are chained together, and each of clusters $C_{200}$~$C_{202}$ has the first data length (i.e. 512 Bytes). Finally, the link relation of clusters $C_{200}$~$C_{202}$ is recorded into the FAT.

For example, as shown in FIG. 5a, the data length of the first header ($H_1$) is 712 Bytes, the data length of the second header ($H_2$) is 900 Bytes, and the data length of the third header ($H_3$) is determined to be (2*512)=1024 Bytes using the above formula. Next, the third header ($H_3$) is stored into the clusters $C_{300}$~$C_{301}$ (not limited to this cluster link relation, other different types of cluster link relation may be available) of the memory card, wherein the clusters $C_{300}$~$C_{301}$ are chained together, and each of clusters $C_{300}$~$C_{301}$ has the first data length. Finally, the link relation of clusters $C_{300}$~$C_{301}$ is recorded into the FAT.

In step S8, the link relation of clusters recorded in the FAT is further modified to link cluster $C_{202}$ to cluster $C_{102}$ such that the clusters $C_{200}$~$C_{202}$ and $C_{102}$~$C_{104}$ are chained together, thereby generating the second file to replace the first file (as shown in FIG. 4b). Finally, the modified FAT is stored into the memory card so that the files with the auxiliary data can be retrieved from the memory card under the FAT file system.

In the embodiment shown in FIG. 5b, the link relation of clusters recorded in the FAT is modified to link cluster $C_{301}$ to cluster $C_{101}$ such that the clusters $C_{300}$~$C_{301}$ and $C_{101}$~$C_{104}$ are chained together, thereby generating the second file to replace the first file. Finally, the modified FAT is stored into the memory card. It is noted that in this embodiment, the effective length of the second file is also determined to be Z*L−D since the portion of data (h1) in the original first header ($H_1$) is contained in the cluster $C_{101}$.

To sum up, the operation method of file system according to the present invention simply needs to adjust the data length of the header and link the remaining data to the adjusted header by modifying the FAT and thus, it eliminates a large amount of data movement during modifying the file header. Therefore, the method for modifying the file header of the present invention can improve in both execution speed and system performance.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An operation method of a file system, comprising:

retrieving a first header of a first file, wherein the first file comprises the first header and a data segment, the data segment comprises a first data segment and a second data segment, a plurality of clusters $A_1 \sim A_N$ chained together constitute the first file, each of the clusters $A_1 \sim A_N$ has a first data length, a data length of the first data segment is smaller than the first data length, the first header and the first data segment are stored in the clusters $A_1 \sim A_Y$, the second data segment is stored in the clusters $A_{Y+1} \sim A_N$, N and Y are positive integer, and N>Y, the first data segment is stored in the cluster $A_Y$;

adding auxiliary data to the first header to generate a second header;

writing dummy data into the second header to adjust the data length of the second header, thereby serving as a third header; and modifying a link relation of clusters recorded in a file allocation table such that the third header and the second data segment are linked together, thereby generating a second file.

2. The method as claimed in claim 1, wherein the data length of the third header is (Z*L−D), L is the first data length, D is the data length of the first data segment, and Z is the positive integer greater than or equal to Y.

3. The method as claimed in claim 2, further comprising:

storing the third header and the first data segment into a plurality of clusters $B_1 \sim B_Z$, wherein the clusters $B_1 \sim B_Z$ are chained together, and each of the clusters $B_1 \sim B_Z$ has the first data length; and recording the link relation of the clusters $B_1 \sim B_Z$ into the file allocation table.

4. The method as claimed in claim 3, wherein the step of modifying the link relation comprises linking the cluster $B_Z$ to the cluster $A_{Y+1}$, such that the clusters B1~BZ and the clusters $A_{Y+1} \sim A_N$ are chained together, thereby generating the second file.

5. The method as claimed in claim 1, wherein the data length of the third header is (Z*L), L is the first data length, and Z is the positive integer greater than or equal to Y.

6. The method as claimed in claim 5, further comprising:

storing the third header into a plurality of clusters $B_1 \sim B_Z$, wherein the clusters $B_1 \sim B_Z$ are chained together, and each of the clusters $B_1 \sim B_Z$ has the first data length; and recording the link relation of the clusters $B_1 \sim B_Z$ into the file allocation table.

7. The method as claimed in claim 5, wherein the step of modifying the link relation comprises linking the cluster $B_Z$ to the cluster $A_Y$, such that the clusters $B_1 \sim B_Z$ and the clusters $A_Y \sim A_N$ are chained together, thereby generating the second file.

8. The method as claimed in claim 1, wherein the first file is a picture file, and the first header has a photo-taking time of the picture file.

9. The method as claimed in claim 1, wherein the auxiliary data is a location information showing a photo-taking site of the first file.

10. An electronic device, comprising:

a random access memory coupled to a bus for storing temporary data;

a flash memory coupled to the bus for storing a location information;

a processor coupled to the bus for retrieving a first header of a first file and a file allocation table from a memory card, writing the first header and the file allocation table into the random access memory, wherein the first file comprises the first header and a data segment, the data segment comprises a first data segment and a second data segment, a plurality of clusters $A_1 \sim A_N$ chained together constitute the first file, each of the clusters $A_1 \sim A_N$ has a first data length, a data length of the first data segment is smaller than the first data length, the first header and the first data segment are stored in the clusters $A_1 \sim A_Y$, the second data segment is stored in the clusters $A_{Y+1} A_N$, N and Y are positive integer, and N>Y, the first data segment is stored in the cluster $A_Y$;

wherein the processor further retrieves the location information and writes it into the first header to generate a second header, writes dummy data into the second header to adjust the data length of the second header, thereby serving as a third header, and modifies a link relation of clusters recorded in the file allocation table such that the third header and the second data segment are linked together, thereby generating a second file.

11. The device as claimed in claim 10, wherein the processor further writes the third header into the memory card and then writes the modified file allocation table into the memory card.

12. The device as claimed in claim 10, wherein the data length of the third header is (Z*L−D), L is the first data length, D is the data length of the first data segment, and Z is the positive integer greater than or equal to Y.

13. The device as claimed in claim 12, the processor further stores the third header and the first data segment into a plurality of clusters $B_1 \sim B_Z$, and records the link relation of the clusters $B_1 \sim B_Z$ into the file allocation table, wherein the clusters $B_1 \sim B_Z$ are chained together, and each of the clusters $B_1 \sim B_Z$ has the first data length.

14. The device as claimed in claim 13, wherein the step of modifying the link relation comprises linking the cluster $B_Z$ to the cluster $A_{Y+1}$, such that the clusters $B_1 \sim B_Z$ and the clusters $A_{Y+1} \sim A_N$ are chained together, thereby generating the second file.

15. The device as claimed in claim 10, wherein the data length of the third header is (Z*L), L is the first data length, and Z is the positive integer greater than or equal to Y.

16. The device as claimed in claim 15, wherein the processor further stores the third header into a plurality of clusters $B_1 \sim B_Z$, and records the link relation of the clusters $B_1 \sim B_Z$ into the file allocation table, wherein the clusters $B_1 \sim B_Z$ are chained together, and each of the clusters $B_1 \sim B_Z$ has the first data length.

17. The device as claimed in claim 16, wherein the step of modifying the link relation comprises linking the cluster $B_Z$ to the cluster $A_Y$, such that the clusters $B_1 \sim B_Z$ and the clusters $A_{Y \sim AN}$ are chained together, thereby generating the second file.

18. The device as claimed in claim 10, wherein the first file is a picture file, and the first header has a photo-taking time of the picture file.

19. The device as claimed in claim 10, wherein the location information is a photo-taking site of the first file.

* * * * *